(12) United States Patent
Koch et al.

(10) Patent No.: US 9,238,737 B2
(45) Date of Patent: Jan. 19, 2016

(54) RADIATION-CURABLE, ELECTRICALLY CONDUCTIVE COATING MIXTURE

(75) Inventors: Matthias Koch, Erkrath (DE); Kerstin Unger, Oberhausen (DE); Wolfgang Lorenz, Erkrath (DE); Andreas Kunz, Remscheid (DE); Eva Wilke, Hann (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 328 days.

(21) Appl. No.: 11/611,812

(22) Filed: Dec. 15, 2006

(65) Prior Publication Data

US 2007/0128365 A1 Jun. 7, 2007

Related U.S. Application Data

(63) Continuation of application No. PCT/EP2005/005376, filed on May 18, 2005.

(30) Foreign Application Priority Data

Jun. 16, 2004 (DE) .......................... 10 2004 028 764

(51) Int. Cl.
*C09D 5/24* (2006.01)
*C09D 5/08* (2006.01)

(52) U.S. Cl.
CPC .... *C09D 5/24* (2013.01); *C09D 5/084* (2013.01); *Y10T 428/12569* (2015.01)

(58) Field of Classification Search
CPC ...... C09D 5/24; C09D 5/084; C08K 2003/04; C08K 2003/0893; C08K 2201/001
USPC ..................... 524/439, 495; 106/14.44, 14.21
See application file for complete search history.

(56) References Cited

U.S. PATENT DOCUMENTS

| | | | |
|---|---|---|---|
| 3,519,495 A | 7/1970 | Plaxton | |
| 4,719,038 A * | 1/1988 | Sobata et al. | 252/511 |
| 4,775,600 A | 10/1988 | Adaniya et al. | |
| 5,677,367 A * | 10/1997 | Savin | 523/219 |
| 5,847,037 A | 12/1998 | Mazanek et al. | |
| 6,180,043 B1 * | 1/2001 | Yonemochi et al. | 264/255 |
| 6,479,103 B1 | 11/2002 | Wichelhaus et al. | |
| 6,784,222 B2 * | 8/2004 | Zychowski et al. | 522/80 |
| 6,835,459 B2 | 12/2004 | Lorenz et al. | |
| 7,220,298 B2 * | 5/2007 | Hintze-Bruning et al. | 106/14.44 |
| 2005/0016141 A1 | 1/2005 | Hong et al. | |
| 2005/0065269 A1 | 3/2005 | Hintze-Bruning et al. | |
| 2005/0186442 A1 | 8/2005 | Gros | |
| 2005/0228113 A1 * | 10/2005 | Baumer et al. | 524/500 |
| 2011/0045201 A1 * | 2/2011 | Gros et al. | 427/496 |

FOREIGN PATENT DOCUMENTS

| | | |
|---|---|---|
| DE | 30 18 765 A1 | 11/1981 |
| DE | 34 12 234 C2 | 10/1986 |
| DE | 36 40 662 C2 | 1/1993 |
| DE | 10146446 A1 | 2/2003 |
| DE | 10202543 A1 | 8/2003 |
| DE | 10200928 A1 | 9/2003 |
| DE | 10217624 A1 | 11/2003 |
| DE | 10240972 A1 | 3/2004 |
| EP | 0 573 015 A1 | 12/1993 |
| EP | 0 380 024 B1 | 4/1995 |
| EP | 0 761 625 A1 | 3/1997 |
| JP | 63-83172 * | 4/1988 |
| WO | WO 99/24515 A1 | 5/1999 |
| WO | WO 00/75250 A1 | 12/2000 |
| WO | 0130923 A2 | 5/2001 |
| WO | 0185853 A2 | 11/2001 |
| WO | WO 01/85860 A1 | 11/2001 |
| WO | 02070616 A1 | 9/2002 |
| WO | WO 03/062328 A1 | 7/2003 |
| WO | WO 03/089507 A1 | 10/2003 |
| WO | WO 03/089529 A1 | 10/2003 |
| WO | WO 03/089530 A1 | 10/2003 |

OTHER PUBLICATIONS

English Abstract of JP36308172A, Apr. 1988, Japan.*
Opposition from Chemetall dated Jul. 31, 2008 concerning European application 1756236 B1.
"Salt Spray Testing", DIN 50 021, Beuth Verlag GmbH Berlin, pp. 1-6, Jun. 1988.
"Paints, varnishes and similar coating materials; determination of the flow time by the DIN cup", DIN 53211, Beuth Verlag GmbH Burggrafenstrasse 6, 1000 Berlin 30, pp. 1-5, Jun. 1987.
"Testing of paints, varnishes and similar coating materials; scheme for the evaluation of tests", DIN 53230, Beuth Verlag GmbH Berlin, pp. 1-4, Apr. 1983.
"Paints, varnishes and similar coating materials; Cross-cut test; Identical with ISO/DIS 2409:1990", DIN 53151, Beuth Verlag GmbH Burggrafenstrasse 6, 1000 Berlin 30, pp. 1-14, Jul. 1990.

* cited by examiner

*Primary Examiner* — Tae H Yoon
(74) *Attorney, Agent, or Firm* — Mary K. Cameron

(57) ABSTRACT

The present invention relates to electrically conductive and electrically weldable anti-corrosion compositions for coating metal surfaces, a process for coating metal surfaces with electrically conductive organic coatings, as well as the correspondingly coated and optionally painted metal strips, sheets or parts, the coatings comprising: an organic binder, an anti-corrosion pigment, at least one conductive pigment with a density of at least 3 g/cm$^3$ and optionally at least one conductive pigment with a density of less than 3 g/cm$^3$.

20 Claims, No Drawings

RADIATION-CURABLE, ELECTRICALLY CONDUCTIVE COATING MIXTURE

CROSS-REFERENCE TO RELATED APPLICATION

This application is a continuation under 35 USC Sections 365(c) and 120 of International Application No. PCT/EP2005/005376, filed 18 May 2005, which claims priority from German Application No. 10 2004 028 764.3, filed 16 Jun. 2004, each of which is incorporated herein by reference in its entirety.

FIELD OF THE INVENTION

The present invention relates to electrically conductive and electrically weldable anti-corrosion compositions for coating metal surfaces, a process for coating metal surfaces with electrically conductive organic coatings, as well as the correspondingly coated and optionally painted metal strips, sheets or parts.

BACKGROUND OF THE INVENTION

In the metalworking industry, particularly in automobile construction, the metal parts of the products have to be protected against corrosion. According to the conventional prior art, the sheet metal is first coated with anti-corrosion oils in the rolling mill and optionally coated with drawing compounds prior to forming and stamping. In the vehicle construction sector, appropriately shaped sheet metal parts are stamped out for vehicle bodies or body parts and shaped using such drawing compounds or oils in a deep-drawing process, then they are assembled, generally by means of welding and/or flanging and/or bonding, and finally cleansed in a costly procedure. Anti-corrosion surface pretreatments, such as phosphating and/or chromating, are applied followed by a first paint layer applied to the structural parts by electrodeposition. In general, this first electro-deposition process, especially in the case of car bodies, is followed by the application of several more layers of paint. For less demanding applications, such as for example domestic appliances, a powder coating can be applied directly after the mentioned anti-corrosion pretreatment.

In the metal processing industry, such as in the vehicle and domestic appliance construction sectors, in order to simplify the process, there is a need to reduce the cost of chemical anti-corrosion treatment. This may be achieved by providing the raw material in the form of metal sheets or metal strips which have already been provided with an anti-corrosion layer. There is, therefore, a need to find simpler methods of production in which pre-coated sheets may be welded and then painted in an electro-deposition process in a well-proven manner. Thus, there are a number of processes in which an organic, more or less conductive coating is applied, subsequent to phosphation and/or chromation in a so-called coil coating process. As a rule, these organic coatings should be made up in such a way that they are sufficiently electrically conductive so as not impair the typical welding processes used in the car industry, for example electrical spot-welding. In addition, these coatings should be overpaintable with conventional electro-deposition paints.

Particularly in the car industry, in addition to normal steel sheeting, steel sheeting and/or aluminum sheeting, which have been galvanised and/or alloy galvanised in a variety of processes, have also been used to an increasing extent recently.

The coating of steel sheeting with organic coatings that are weldable and which are applied directly in the rolling mill by the so-called coil coating process is known in principle. German patent DE-C-3412234 describes a conductive and weldable anti-corrosion primer for electrolytically thin-layer galvanized, phosphatized or chromatized and drawable steel sheeting. This anti-corrosion primer consists of a mixture of more than 60% zinc, aluminum, graphite and/or molybdenum disulfide and also another anti-corrosion pigment and 33 to 35% of an organic binder and about 2% of a dispersion auxiliary or catalyst. Polyester resins and/or epoxy resins and derivatives thereof are proposed as organic binders. It is assumed that this technology represents the basis of the coating agent known in the industry by the name "Bonazinc® 2000". Although this process provides some advantages as compared with the procedure described above (temporary corrosion protection with anti-corrosion oils followed by subsequent degreasing after assembling the metallic components), the process described in DE-C-3412234 still requires much improvement where:

The coating is not sufficiently spot-weldable.
The baking temperature for this type of coating ranges from 250 to 260° C. peak metal temperature (PMT) and is still too high. Many new types of steel with a "bake hardening effect" cannot be employed for this type of high baking temperature.

In accordance with the disclosure in the German patent DE-C-3412234, the organic binder may consist of polyester resins and/or epoxy resins and derivatives thereof. Specific examples mentioned are an epoxide/phenyl precondensate, an epoxy ester and linear, oil-free mixed polyesters based on terephthalic acid.

European patent application EP-A-573015 describes an organic-coated steel composite sheet, consisting of surfaces coated with zinc or a zinc alloy on one or two sides, provided with a chromate film and an organic coating applied thereto with a layer thickness of 0.1 to 5 μm. The organic coating is formed from a primer composition that consists of an organic solvent, an epoxy resin having a molecular weight between 500 and 10,000, an aromatic polyamine and a phenol or cresol compound as accelerator. In addition, the primer composition comprises a polyisocyanate and colloidal silica. In accordance with the teaching of this document, the organic coating is preferably applied in a dry film of layer thickness 0.6 to 1.6 μm, since layers thinner than 0.1 μm are too thin to provide any corrosion protection. Layer thicknesses greater than 5 μm, however, impair weldability.

In an analogous manner, German patent application DE-A-3640662 describes a surface-treated steel sheet comprising a zinc-coated or zinc alloy-coated steel sheet, a chromate film produced on the surface of the steel sheet and a layer of a resin composition produced on the chromate film. This resin composition consists of a basic resin that is prepared by reacting an epoxy resin with amines, and a polyisocyanate compound. This film should also be used with a dry film thickness of less than about 3.5 μm, because thicker layers greatly reduce the weldability.

European patent application EP-A-380 024 describes organic coating materials based on a bisphenol-A-type epoxy resin having a molecular weight between 300 and 100,000 and also a polyisocyanate or blocked polyisocyanate, pyrogenic silica and at least one organic coloring pigment. A chromate-containing pretreatment with a high application of Cr is also required in this process. The organic layer should be not thicker than 2 μm, since sheets with thicker organic layers cannot be satisfactorily spot-welded and the properties of the electro-dipcoated paint applied to the organic coating are negatively affected.

International patent application WO 99/24515 discloses a conductive and weldable anti-corrosion composition for coating metal surfaces, characterised in that it comprises:
(a) 10 to 40 wt. % of an organic binder comprising:
 (aa) at least one epoxy resin;
 (ab) at least one hardener selected from guanidine, substituted guanidines, substituted ureas, cyclic tertiary amines and mixtures thereof;
 (ac) at least one blocked polyurethane resin;
(b) 0 to 15 wt. % of an anti-corrosion pigment based on silicate;
(c) 40 to 70 wt. % of powdered zinc, aluminum, graphite and/or molybdenum sulfide, carbon black, iron phosphide; and
(d) 0 to 30 wt. % of a solvent.

The international patent application WO 03/089530 describes a mixture for applying a polymeric corrosion resistant, electrically weldable coating, whose electrically conductive particles should be more electrically conductive than that of zinc particles. Furthermore, these conductive particles should have a Moh hardness greater than 4. According to this publication, a photoinitiator can be present in the composition. It can also comprise water and/or an organic solvent. In addition, this document teaches that coating compositions of this type that are rich in zinc particles are undesirable primer coatings for welding as the tooling would be heavily contaminated from abrasion.

The international patent application WO 03/062328 describes corrosion resistant mixtures comprising corrosion resistant pigments, amorphous silicon dioxide that is modified with metal ions, such as compounds of the general formula $M_n(X)_m$, in which M are a central atom from the group of Lewis acceptors and Lewis donor ligands, which comprise at least one bridging atom from the elements of the $5^{th}$ or $6^{th}$ main group of the periodic table of the elements. The added binders should be preferably (meth)acrylate copolymers, partially saponified polyvinyl esters, polyesters, alkyd resins, polylactones, polycarbonates, polyethers, epoxy resin amine adducts, polyureas, polyamides, polyimides or polyurethanes. This document further discloses that the coating materials can be crosslinked with actinic radiation, particularly UV radiation, or thermally crosslinked. They are suitable for use in coil coating processes.

The international patent application WO 00/75250 describes a process for applying a weldable anti-corrosion coating on a metallic substrate, especially an autobody sheet steel in the automobile industry, as well as coating mixtures for carrying out this process. The coating mixture should comprise a solid polymeric organic binder, a low molecular weight, liquid, radically polymerizable compound and a compound that forms radicals when irradiated with actinic radiation. In addition, these compositions should comprise a conductive, inorganic pigment from the group of the oxides, phosphates or phosphides of iron or aluminum or graphite mica pigments. According to the teaching of this document, coating mixtures that comprise zinc powder are disadvantageous as they often tend to instances of corrosion, which initiates between the pigmented layer and the metallic or galvanized substrate.

The international patent applications WO 03/089507 and WO 03/089529 describe coating mixtures for the application of a thin, polymeric, corrosion resistant, low abrasion, formable and electrically conductive coating on a metallic substrate. These compositions should comprise at least one binder as well as optionally a reactive diluent and at least one crosslinker and/or at least one photoinitiator as well as optionally a crosslinkable compound such as e.g. isocyanates, blocked isocyanates, isocyanurates and the like as well as an organic solvent and/or water. In addition, the mixture should comprise electrically conductive and/or semi-conductive elements/compounds that have a particle size distribution with a $d_{80}$ diameter of <6 μm, alternatively electrically conductive or semi-conductive amine-containing and/or ammonium-containing compounds are proposed. Alternatively, mixtures of electrically conductive hard particles and very soft or soft organic, lubricious, electrically conductive or semiconductive particles are proposed as pigment fractions. Specific examples of lubricious, very soft or soft particles are: graphite, sulfide, selenide and/or telluride.

There is a need to provide improved coating compositions that satisfy the requirements of the automobile industry in all respects. In comparison to the prior art, the following properties of organic coating compositions suitable for the coil coating process should be improved:

a clear reduction in white rust on galvanised steel sheeting in the spray test according to DIN 50021, i.e. better corrosion protection;

an improvement in adhesion of the organic coating to the metallic substrate in accordance with an evaluation by the T-bend test (ECCA standard) and impact test (ECCA standard);

fit for external use (i.e. capacity for use as the external sheet in a car body;

adequate corrosion protection, also with Cr-free pretreatment processes;

today's still conventional cavity sealing with wax or waxcontaining products may become unnecessary due to the improved corrosion protection;

adequate suitability for typical car welding processes;

resistance towards process chemicals used in automobile manufacturing; and paintability.

In order for these coatings to be applicable in the coil coating process, they must have a suitable viscosity. For highly pigmented systems this usually requires the presence of solvents such as water or organic solvents, which evaporate when the coating is cured. The use of water requires additional energy costs, the use of organic solvents requires additional technical measures in order to prevent their escape into the atmosphere.

SUMMARY OF THE INVENTION

In one aspect the invention provides an electrically conductive and weldable, essentially solvent-free anti-corrosion composition for coating metal surfaces, comprising, based on the total composition, a) 5 to 80 wt. % of an organic binder,
b) 0 to 15 wt. % of an anti-corrosion pigment
c1) up to 90 wt. % of a conductive pigment with a density of at least 3 g/cm$^3$, preferably selected from zinc, iron, stainless steel, molybdenum disulfide and phosphides and oxides of iron, all in powder form, which can be present alone or in a mixture, wherein sum $\Sigma(x_{L(i)})$ of the weight fractions of all the conductive pigments ($x_{L(i)}$) in the total composition, expressed as the decimal fraction, is in the range $\Sigma\{(0.09 \text{ to } 0.13)*D_i*a_i\}$, wherein $D_i$ means the density of the i-th conductive pigment in g/cm$^3$ and $a_i$ the fraction of the weight of the i-th conductive pigment in the total weight of all the conductive pigments, with the proviso that the sum $\Sigma(x_{L(i)})$ of the weight fractions of all the conductive pigments ($x_{L(i)}$) in the total composition, expressed as the decimal fraction, is not more than 0.9, as well as, when required, up to 50 wt. % additional active or auxiliary agents, wherein the amounts of the components add up to 100%, wherein the composition has a viscosity, measured at the application temperature with a DIN flow cup with a 4 mm flow nozzle, in the range 10 to 120 seconds, preferably in the range 30 to 90 seconds.

In another embodiment the composition, additionally comprises c2) 2 to 20 wt. % of a conductive pigment with a density of less than 3 g/cm3, preferably selected from aluminum, carbon black and graphite.

In a preferred embodiment the organic binder is curable by energy-rich radiation.

In one embodiment the organic binder comprises:
aa) at least one radically polymerizable resin,
ab) at least one reactive diluent,
ac) at least one photoinitiator.

The radically polymerizable resin aa) can be selected from polyester-, urethane- or epoxy-modified (meth)acrylate resins or a mixture hereof. Desirably the radically polymerizable resin has a molecular weight of at least 500.

In a preferred embodiment, the organic binder, based on the total amount of the organic binder, comprises: 2 to 80 wt. % of component aa), 4 to 95 wt. % of component ab) and 0.1 to 10 wt. % of component ac), wherein the amounts of the components add up to 100%.

In one embodiment, the weight fraction XB of the organic binder in the total composition, expressed as the decimal fraction, is chosen such that it is in the range {(0.5 to 1) minus (sum $\Sigma(x_{L(i)})$ of the weight fractions of all conductive pigments)}.

Component b) may desirably comprise at least one anti-corrosion pigment and/or at least one corrosion inhibitor, selected from doped silica, silicates of divalent metals, aluminum- and zinc phosphates and modified products thereof, surface modified titanium dioxide, alkoxytitanates, silanes, benzthiazole derivatives, zinc- or calcium gluconates, salicylic acid derivatives and phosphoric acid esters of alkoxylated cellulose ("cellulose phosphate").

In one embodiment, zinc, graphite, iron phosphide, iron oxide, all in powder form, or a mixture of two or more of these substances, are present as the component c).

Desirably, compositions according to the invention are free of binder ingredients that comprise reactive or blocked isocyanate groups. In preferred embodiments the compositions are substantially free of solvent.

Another aspect of the invention is a process for coating metal surfaces with a conductive organic anti-corrosion layer, wherein
1) when required the metal surfaces are cleaned,
2) the metal surfaces are contacted with a liquid that comprises at least one organic compound having a molecular weight of not more than 700 g/mol, which has at least one radically polymerizable crosslinkable group and at least one group with active hydrogen,
3) the metal surfaces are then coated with an electrical conductive and weldable, essentially solvent-free anti-corrosion composition that, based on the total composition, comprises
a) 5 to 98 wt. % of an organic binder,
b) 0 to 15 wt. % of an anti-corrosion pigment,
c1) 20 to 90 wt. % of a conductive pigment with a density of at least 3 g/cm³, preferably selected from zinc, iron, stainless steel, molybdenum disulfide and phosphides and oxides of iron all in powder form, which can be present alone or in a mixture, wherein in this case the weight fraction of the organic binder a) is maximum 80 wt. % and/or
c2) 2 to 20 wt. % of a conductive pigment with a density of less than 3 g/cm³, preferably selected from aluminum, carbon black and graphite as well as, when required, up to 50 wt. % of other active or auxiliary substances, wherein the proportions of the components total 100% and wherein the composition has a viscosity, measured at the application temperature with a DIN flow cup with a 4 mm flow nozzle, in the range 10 to 120 seconds, preferably in the range 30 to 90 seconds, with a layer thickness, such that after curing in the subsequent step d) a layer thickness of 0.5 to 10 µm, preferably 1 to 6 µm, is obtained, and then
4) the applied coating is cured by irradiation with energy-rich radiation for a time of 0.001 to 300 seconds, preferably 0.1 to 30 seconds.

Desirably the metal surfaces coated are surfaces of cold-rolled steel, aluminum or galvanized or alloy galvanized steels. In another aspect, the invention provides a metal object with an anti-corrosion layer, which is manufactured according to a process according to the invention. More particularly, the metal objects are those that possess a coating system of at least the following individual layers on the metal surface:
a) conductive organic anti-corrosion layer, obtained according to the above-described inventive process, and
b) powder coat layer with a wall thickness of 70 to 120 µm.

In another aspect a metal object is provided that possesses a coating system of at least the following individual layers on the metal surface:
a) conductive organic anti-corrosion layer, obtained according to the above-described inventive process,
b) electro deposition paint,
c) single or two-layer top coat.

Desirably, the metal object has a coating wherein the electro deposition paint has a thickness of 25 to 35 µm, and there is no filler layer between this electro deposition paint and the single or two-layer top coat.

In yet another aspect of the invention, a process for manufacturing a metal object is provided, wherein
I) sheets are produced with a coated metal surface, in which
1) when required the metal surface is cleaned,
2) the metal surfaces are contacted with a liquid that comprises at least one organic compound having a molecular weight of not more than 700 g/mol, which has at least one radically polymerizable crosslinkable group and at least one group with active hydrogen,
3) the metal surfaces are then coated with an electrical conductive and weldable, essentially solvent-free anti-corrosion composition that, based on the total composition, comprises
a) 5 to 98 wt. % of an organic binder,
b) 0 to 15 wt. % of an anti-corrosion pigment,
c1) 20 to 90 wt. % of a conductive pigment with a density of at least 3 g/cm³, preferably selected from zinc, iron, stainless steel, molybdenum disulfide and phosphides and oxides of iron all in powder form, which can be present alone or in a mixture, wherein in this case the weight fraction of the organic binder a) is maximum 80 wt. % and/or
c2) 2 to 20 wt. % of a conductive pigment with a density of less than 3 g/cm³, preferably selected from aluminum, carbon black and graphite as well as, when required, up to 50 wt. % of other active or auxiliary substances, wherein the proportions of the components total 100% and wherein the composition has a viscosity, measured at the application temperature with a DIN flow cup with a 4 mm flow nozzle, in the range 10 to 120 seconds, preferably in the range 30 to 90 seconds, with a layer thickness, such that after curing in the subsequent step d) a layer thickness of 0.5 to 10 µm, preferably 1 to 6 µm, is obtained, and then 4) the applied coating is cured by irradiation with energy-rich radiation for a time of 0.001 to 300 seconds, preferably 0.1 to 30 seconds, II) the sheet is shaped and/or assembled into metal objects with metal surfaces, III) when required, the metal surfaces of the metal object are cleaned and IV) the metal surfaces of the metal object are coated with a powder coat with a thickness of 70 to 120 µm.

In yet another aspect of the invention, a process for manufacturing a metal object is provided, wherein I) a sheet is produced with a coated metal surface, in which
1) when required the metal surface is cleaned,
2) the metal surfaces are contacted with a liquid that comprises at least one organic compound having a molecular weight of not more than 700 g/mol, which has at least one radically polymerizable crosslinkable group and at least one group with active hydrogen,
3) the metal surfaces are then coated with an electrical conductive and weldable, essentially solvent-free anti-corrosion composition that, based on the total composition, comprises
   a) 5 to 98 wt. % of an organic binder,
   b) 0 to 15 wt. % of an anti-corrosion pigment,
   c1) 20 to 90 wt. % of a conductive pigment with a density of at least 3 g/cm³, preferably selected from zinc, iron, stainless steel, molybdenum disulfide and phosphides and oxides of iron all in powder form, which can be present alone or in a mixture, wherein in this case the weight fraction of the organic binder a) is maximum 80 wt. % and/or
   c2) 2 to 20 wt. % of a conductive pigment with a density of less than 3 g/cm³, preferably selected from aluminum, carbon black and graphite as well as, when required, up to 50 wt. % of other active or auxiliary substances,
   wherein the proportions of the components total 100% and wherein the composition has a viscosity, measured at the application temperature with a DIN flow cup with a 4 mm flow nozzle, in the range 10 to 120 seconds, preferably in the range 30 to 90 seconds, with a layer thickness, such that after curing in the subsequent step d) a layer thickness of 0.5 to 10 µm, preferably 1 to 6 µm, is obtained, and then
4) the applied coating is cured by irradiation with energy-rich radiation for a time of 0.001 to 300 seconds, preferably 0.1 to 30 seconds, II) the sheet is shaped and/or assembled into metal objects with metal surfaces, III) when required, the metal surfaces of the metal object are cleaned and IV) the metal surfaces of the metal object are coated with a cathodically deposited electro deposited paint with a thickness in the range 25 to 35 µm and then, without applying a filler coat V) coated with a single or two-layer top coat.

In yet another aspect of the invention, a process for manufacturing a metal object is provided, wherein I) a sheet is produced with a coated metal surface, in which
1) when required the metal surface is cleaned,
2) the metal surfaces are contacted with a liquid that comprises at least one organic compound having a molecular weight of not more than 700 g/mol, which has at least one radically polymerizable crosslinkable group and at least one group with active hydrogen,
3) the metal surfaces are then coated with an electrical conductive and weldable, essentially solvent-free anti-corrosion composition that, based on the total composition, comprises
   a) 5 to 98 wt. % of an organic binder,
   b) 0 to 15 wt. % of an anti-corrosion pigment,
   c1) 20 to 90 wt. % of a conductive pigment with a density of at least 3 g/cm³, preferably selected from zinc, iron, stainless steel, molybdenum disulfide and phosphides and oxides of iron all in powder form, which can be present alone or in a mixture, wherein in this case the weight fraction of the organic binder a) is maximum 80 wt. % and/or
   c2) 2 to 20 wt. % of a conductive pigment with a density of less than 3 g/cm³, preferably selected from aluminum, carbon black and graphite as well as, when required, up to 50 wt. % of other active or auxiliary substances,
   wherein the proportions of the components total 100% and wherein the composition has a viscosity, measured at the application temperature with a DIN flow cup with a 4 mm flow nozzle, in the range 10 to 120 seconds, preferably in the range 30 to 90 seconds, with a layer thickness, such that after curing in the subsequent step d) a layer thickness of 0.5 to 10 µm, preferably 1 to 6 µm, is obtained, and then
4) the applied coating is cured by irradiation with energy-rich radiation for a time of 0.001 to 300 seconds, preferably 0.1 to 30 seconds, II) the sheet is shaped and/or assembled into metal objects with metal surfaces, III) when required, the metal surfaces of the metal object are cleaned and IV) the metal surfaces of the metal object are coated with a cathodically deposited electro deposited paint with a thickness in the range 25 to 35 µm and then, without applying a filler coat V) coated with a single or two-layer top coat.

Preferably, in any of the above-described processes, the sheets are at least partially assembled into the metal objects by electro welding in step II).

DETAILED DESCRIPTION OF PREFERRED EMBODIMENTS

In a first aspect, the present invention relates to an electrically conductive and weldable, essentially solvent-free anti-corrosion composition for coating metal surfaces, comprising, based on the total composition,
a) 5 to 98 wt. % of an organic binder,
b) 0 to 15 wt. % of an anti-corrosion pigment
c1) 20 to 90 wt. % of a conductive pigment with a density of at least 3 g/cm³, preferably selected from zinc, iron, stainless steel, molybdenum disulfide and phosphides and oxides of iron, all in powder form, which can be present alone or in a mixture, wherein in this case the weight fraction of the organic binder a) is maximum 80 wt. %, and/or c2) 2 to 20 wt. % of a conductive pigment with a density of less than 3 g/cm3, preferably selected from aluminum, carbon black and graphite if required, up to 50 wt. % of other active or auxiliary substances, wherein the proportions of the components total 100% wherein the composition has a viscosity, measured at the application temperature with a DIN flow cup with a 4 mm flow nozzle, in the range 10 to 120 seconds, preferably in the range 30 to 90 seconds. These types of coating agent are suitable for use in coil coating processes.

In the context of the present invention, a coating is understood to be electrically conductive, when it can be welded, after curing, under the usual conditions of joint technology in the automobile industry, in particular in a spot-welding process. Furthermore, the electrical conductivity of these coatings is sufficient to enable the complete deposition of electrodipcoated paints.

In the context of this invention, "essentially solvent-free" is understood to mean an anti-corrosion composition that at best comprises solvent residues or traces from the manufacturing processes of the intermediates. As a rule, the solvent residues are significantly below about 5 wt. % of the total composition, preferably even significantly below about 1 wt. % of the total composition, also for combinations of a plurality of commercially available binder components. In the context of this invention, solvents can be water and organic solvents, however not the reactive diluents described below, which form part of the coating on curing. In contrast, solvents are characterized in that they evaporate on curing the coating.

The viscosity of the inventive agent is measured, as usual in the painting industry, according to DIN 53211 with a DIN flow cup having a flow nozzle of 4 mm. The time for a defined quantity of the agent to flow out of the cup is measured. The higher the viscosity, the longer will be the time.

Preferably, the organic binder can be crosslinked by the action of energy-rich radiation (=radiation, whose quanta have at least as much energy as the quanta of visible light, i.e. "actinic radiation", i.e. radiation that can initiate a photochemical reaction), such as, for example visible light, UV radiation, electron beam or γ-radiation. The electron beam should have an energy value between 150 and 500 keV. Crosslinking by means of electromagnetic radiation with a wavelength of 150 to 800 nm is preferred, particularly preferably between 200 and 600 nm (UV and visible radiation). Suitable radiation sources are known to the person skilled in the art. The radiation intensity and irradiation time depend on the type of radiation source and on the process conditions, e.g. distance from the radiation source or the relative movement of the source and substrate. However, in general the time is below 60 seconds, preferably between 0.001 and 30 seconds. The various machine settings can be determined by the person skilled in the art by simple adjustments.

For the organic binder to possess this characteristic, it preferably comprises aa) at least one radically polymerizable resin, preferably a polyester, urethane or epoxy modified methacrylate resin, or a mixture hereof,
ab) at least one reactive diluent, and
ac) at least one photoinitiator.

The organic binder a) is preferably constituted in such a way that it comprises, based on the total weight of the organic binder:

2 to 80 wt. % of component aa),
4 to 95 wt. % of component ab), and
to 10 wt. % of component ac)
wherein the fractions add up to 100%.

A preferred ingredient of the organic binder (component a) of the inventive anti-corrosion composition is the (meth)acrylate resin (aa). This (meth)acrylate resin comprises polymerizable oligomers comprising unsaturated double bonds, such as for example polyester- or polyether oligomers with terminal (meth)acrylate groups or in the side chains, or preferably (meth)acrylate-functional aliphatic, cycloaliphatic and/or aromatic epoxy compounds or polyurethane oligomers containing reactive (meth)acrylate groups. These oligomers should preferably possess two functional unsaturated double bonds and in general have a molecular weight between 500 and 100,000. They are commercially available. Their weight fraction, based on the total composition, is preferably 1 to 50 wt. %, wherein mixtures of different polymers are also possible.

In addition, preferably at least one mono-, di-, tri- or polyfunctional unsaturated low molecular weight (meth)acrylate should be comprised in the binder as component (ab), wherein single compounds or mixtures can be present. These low molecular weight (meth)acrylate compounds are of low viscosity and thus serve as reactive diluents that are polymerized into the binder matrix. Examples of such compounds are: optionally alkoxylated alkane diol- or alkane triol(meth)acrylates such as 1,3-butylene glycol di(meth)acrylate, 1,4-butane diol di(meth)acrylate, 1,6-hexane diol di(meth)acrylate, trialkylene glycol di(meth)acrylate, polyalkylene glycol di(meth)acrylate, tetraalkylene glycol di(meth)acrylate, neopentyl glycol di(meth)acrylate, glycerin alkoxy tri(meth)acrylate, alkoxylated neopentylglycol di(meth)acrylate; (meth)acryl-epoxy compounds, such as bisphenol-A-epoxy di(meth)acrylate; polyhydroxy(meth)acrylates such as pentaerythritol tri(meth)acrylate, trimethylolpropane tri(meth)acrylate, trisalkoxytrimethylolpropane tri(meth)acrylate, di-trimethylolpropane tetra(meth)acrylate, pentaerythritol tetra (meth)acrylate, tris-(2-hydroxyalkyl)isocyanurate tri(meth)acrylate, dipentaeythritol tetra(meth)acrylate, dipentaerythritol penta(meth)acrylate, dipentaerythritol hexa (meth)acrylate, wherein alkylene means ethylene, propylene or butylene and alkoxy mean ethoxy, 1,2- or 1,3-propoxy or 1,4-butoxy.

The following (meth)acrylates can be used for example as the monofunctional acrylate compounds: linear, branched or cyclic alkyl(meth)acrylates such as n-/iso-alkyl (meth)acrylate, cyclohexyl (meth)acrylate, 4-tert.-butyl cyclohexyl (meth)acrylate, dihydrocyclopentadienyl (meth)acrylate, tetrahydrofurfuryl (meth)acrylate, Isobornyl (meth)acrylate, allyl (meth)acrylate, mono(meth)acryloylalkyl phthalate, -succinate or -maleate; alkane diol mono(meth)acrylates, such as hydroxypropyl (meth)acrylate, polyalkylene glycol (meth)acrylate, monoalkoxytrialkylene glycol (meth)acrylate, 2,3-epoxypropyl (meth)acrylate; aromatic (meth)acrylates such as nonylphenol (meth)acrylate, 2-phenoxyalkyl (meth)acrylate; acrylamides such as N,N-di-alkyl (meth)acrylamide, N,N-dialkylaminoalkyl (meth)acrylamide. Moreover, vinyl ethers can also be employed to some extent, such as e.g. vinyl ethyl ether, vinyl propyl ether, vinyl isobutyl ether, vinyl dodecyl ether, butane diol-1,4-divinyl ether, diethylene glycol divinyl ether, hydroxybutyl vinyl ether. The monomeric acrylate compounds can be present singly or in a mixture, wherein the total quantity, based on the total composition, should be 2 to 75 wt. %.

The following preferred radical initiators can be employed as the photoinitiators (component ac), such as, for example 2-benzyl-dimethylamino-1-(4-morpholinophenyl)-butane-1-one, benzildimethylketal-dimethoxyphenyl acetophenone, α-hydroxybenzyl phenyl ketone, 1-hydroxy-1-methylethyl phenyl ketone, oligo-2-hydroxy-2-methyl-1-(4-(1-methylvinyl)phenyl) propanone, benzophenone, methyl orthobenzoyl benzoate, methyl benzoyl formate, 2,2-diethoxyacetophenone, 2,2-di-sec.-butoxyacetophenone, p-phenyl benzophenone, 2-isopropyl thioxanthone, 2-methyl-anthraquinone, 2-ethyl anthraquinone, 2-chloroanthraquinone, 1,2-benzanthraquinone, benzil, benzoin, benzoin methyl ether, benzoin isopropyl ether, α-phenylbenzoin, thioxanthone, diethyl thioxanthone, 1,5-acetonaphthaline, 1-hydroxycyclohexyl phenyl keton, ethyl p-dimethylaminobenzoate. They can be used singly or in a mixture or combined with additional radical initiators of the peroxide type or with amine accelerators. The quantity of photoinitiator, based on the total composition, is preferably 0.1 to 5 wt. %.

Anti-corrosion pigments and/or corrosion inhibitors can be present as component b) in amounts of up to 15 wt. %. The composition preferably comprises 2 to 10 wt. % of anti-corrosion pigments and/or corrosion inhibitors, selected from doped silica, silicates of divalent metals, aluminum and zinc phosphates and modified products thereof, surface modified titanium dioxide, alkoxytitanates, silanes, benzthiazole derivatives, zinc- or calcium gluconates, salicylic acid derivatives and phosphoric acid esters of alkoxylated cellulose ("cellulose phosphate").

The composition comprises a powder of an electrically conductive substance or a mixture of substances as the conductive pigment c) that allows the coated metal surface to be electrically welded and electrophoretically painted, for example by cathodic electro-depositioning. The electrically conductive substance is preferably selected from zinc, aluminum, iron, stainless steel, graphite, molybdenum disulfide, carbon black and phosphides and oxides of iron, all in powder form, which can be present singly or in a mixture. Preferably, the conductive pigment has an average particle size of not more than 10 μm. Preferably, the average particle size is in the range 1 to 8 μm. These types of powder are commercially available. Known methods, such as for example light scattering or electron microscopy are available for the determination of the particle size.

A particularly preferred conductive pigment c) is powdered zinc, graphite, iron phosphide, iron oxide or a mixture of the abovementioned conductive substances optionally combined with molybdenum sulfide. In this way the powdered zinc can be subjected to a (preferably chromium-free) surface treatment, as is known from the prior art for the treatment of zinc surfaces. The pigments can also be chemically modified on the surface with substrate-specific substances in order to obtain a better corrosion protection, an improved conductivity, an improved lubrication effect for shaping or an improved dispersion behavior (i.e. avoiding deposits). Especially when zinc is used, its corrosion (white rust formation) from the passivation of the zinc powder can be reduced, such that the electrical conductivity of the coating and thereby the weldability is retained for a longer period.

The required amount of conductive pigment principally depends on its density, as the anti-corrosion coating must comprise an amount of electrically conductive particles, which is able to form conductive paths through the coating. The greater the density of the electrically conductive particles, the greater is their weight fraction in the coating to form such conductive paths. The weight ratio of conductive pigment to organic binder system will be therefore that much greater, the greater is the density of the conductive pigment. Here, for the use of conductive pigments with a density D of at least 3 g/cm³ it is generally true, for the case where only a single conductive pigment is present, that the weight fraction $x_L$ of the conductive pigment in the total composition, expressed as the decimal fraction, is in the range (0.09 to 0.13)*D, wherein D means the density of the conductive pigment in g/cm³, with the proviso that this weight fraction $x_L$ is in the range 0.2 to 0.9. The preferred weight fraction of the conductive pigment in the total composition, expressed as the decimal fraction (which when multiplied by 100 gives the fraction in weight percent) can be determined by multiplying its density D, expressed as g/cm³, by a number from 0.09 to 0.13. If a mixture of different conductive pigments with a density D of at least 3 g/cm³ is present, then accordingly, the sum $\Sigma(x_{L(i)})$ of the weight fractions of all the conductive pigments $(x_{L(i)})$ in the total composition, expressed as the decimal fraction, is in the range $\Sigma[(0.09 \text{ to } 0.13)*D_i*a_i]$, wherein $D_i$ means the density of the i-th conductive pigment in g/cm³ and $a_i$ the fraction of the weight of the i-th conductive pigment in the total weight of all the conductive pigments, with the proviso that the sum $\Sigma(x_{L(i)})$ of the weight fractions of all the conductive pigments $(x_{L(i)})$ in the total composition, expressed as the decimal fraction, is in the range 0.2 to 0,9.

Conductive pigments with a density of less than 3 g/cm³, such as for example carbon black, graphite and aluminum, tend to yield a thixotropic behavior when dispersed in organic resin mixtures. For severe cases this can be detrimental for the intended application. Thus, such conductive pigments are used in lesser amounts than is the case for denser conductive pigments according to the above formula. Conductive pigments with a density of less than 3 g/cm³ are used in a quantity of 2 to 20 wt. %, based on the total composition. For carbon black or graphite, a maximum quantity between 12 and 15 wt. % is chosen, whereas the use of powdered aluminum has a practical upper limit of about 20 wt. %.

Mixtures of conductive pigments can also be used, which comprise pigments with a density of at least 3 g/cm³ and those with a lower density. An example of this is a mixture of zinc and carbon black or graphite. In this case, the previous condition is valid for the conductive pigments with a density of less than 3 g/cm³, wherein quantities of 2 to 10 wt. %, based on the total composition can suffice. It is then not essential that the conductive pigment or the mixture of conductive pigments with a density of at least 3 g/cm³ be present in a quantity defined by the previously described formula. Rather, a significantly lower weight fraction can be chosen, for example in the range of about a half to about a third of the amount calculated from the cited formula. For example, when using a mixture of zinc and graphite, wherein the graphite fraction, based on the total amount of the anti-corrosion composition, ranges from 3 to 10 wt. %, then the zinc content can be in the range 15 to 50 wt. %.

When using solely zinc, the content of conductive pigment c), based on the total composition, is preferably 45 wt. %, in particular at least 50 wt. % and particularly preferably at least 55 wt. %. Contents of 60 wt. % and above are also possible and actually even more preferred. The upper limit of the content of conductive pigment is principally determined by the viscosity of the agent and the need for a sufficient amount of organic binder relative to the amount of the conductive pigment. Contents of conductive pigments of up to 90 wt. % (based on the total composition) are possible. However, the content of conductive pigment is advantageously limited to 80 wt. % and especially to 75 wt. %. Logically, the anti-corrosion composition comprises a lower weight fraction of organic binder, the higher the weight fraction of conductive pigment. Accordingly, the weight fraction XB of the organic binder in the total composition, expressed as the decimal fraction, is chosen such that it is in the range [(0.5 to 1) minus (sum $\Sigma(x_{L(i)})$ of the weight fractions of all conductive pigments)]. The weight fraction of the organic binder in the total composition, expressed as the decimal fraction, is the result of 1 minus the weight fraction of the conductive pigments, when the anti-corrosion composition comprises no further components than organic binder and conductive pigment. However, if the anti-corrosion composition comprises for example 50 wt. % of additional components with the result that these additional components have a weight fraction of 0.5 in the total composition, then this results in the weight fraction of organic builder, expressed as the decimal fraction, forming the difference 0.5 minus the weight fraction of the conductive pigments. Similarly, the weight fraction of organic builder is obtained if the fraction of other active and auxiliary substances, besides organic builder and conductive pigment is between 0 and 0.5.

In addition to the conductive pigment, the coating agent can comprise pigments or colorants as additional active or auxiliary substances, which are good absorbers of infrared radiation and thereby are heated up (named below as "IR absorbers"). In this way the fraction of IR radiation that the light- and UV-emitters usually also emit, can be absorbed in the coating agent and additionally help to cure the coating. In particular, this is recommended when the conductive pigment does not already have this property. The fraction of additional IR absorber is preferably 0.5 to 20 wt. %, particularly 1 to 10 wt. %, based on the total composition of the coating agent. Examples of them are:
a) typical black pigments such as graphite, carbon black, charcoal, mixed valent Mn- and Fe-oxides and
b) IR-absorbing pigments and colorants, such as cyanine and phthalocyanine derivatives, e.g. Cu hexadeca(phenylthio) phthalocyanine or metal oxyphthalocyanines, nickel dithiolene complexes, azaannulene colorants, alkylated naphthalocyanines, 1,4,5,8-tetrakis(arylanilino) anthraquinones, amino-substituted fluorenes, (Near) IR-absorbing dyes based on diimmonium or pyrylium salts, perylenetetracarboxylic acid diimide compounds, thiophenotribenzoporphyrazine and derivatives thereof.

The composition can comprise one or a plurality of substances as optional additional active or auxiliary substances, selected from anti-deposition agents, defoamers, degassing agents, dispersion auxiliaries, delustrants, molding aids and colorants.

A particular advantage of the inventive composition consists in that the organic binder component can be free of monomeric isocyanate compounds or compounds containing free or latent/blocked isocyanate groups. In this way, firstly the health risks associated with the use of isocyanates are avoided, and secondly this obviates a second curing step specifically for the isocyanate. Moreover, the inventive compositions are essentially free (see the discussion above) of water, solvents and other easily volatile ingredients, which have to be evaporated during the curing process with an energy intensive step and either incinerated or returned to the process loop under ordinary working conditions.

The inventive coating agent is particularly fit for use in the coil coating process. In this process, metal strips are continuously coated. The agent can be applied by various processes that are commonly used in the prior art. For example, application cylinders can be used, which allow the required "wet film thickness" (=the thickness of the wet coating before curing) to be directly adjusted. As an alternative, the metal strip can be immersed in the agent or sprayed with the agent and optionally the required wet film thickness is adjusted by means of consolidation rollers.

Whenever metal strips are coated, which immediately beforehand were electrolytically coated or coated in the melt dipcoating process with a metal layer, for example with zinc or zinc alloys, then the metal surfaces do not need to be cleaned prior to applying the agent. However, when the metal strips have already been stored and particularly when they have been provided with corrosion-protective oils, then a cleaning step is required. The inventive agent can be deposited directly onto cleaned, or because of the manufacturing process, bare metal surfaces. However, the required corrosion protection as well as the adhesion of the coating on the metal surface can be improved by subjecting the metal surface to a corrosion protecting pretreatment with reagents, before applying the agent. This is known in the prior art as the "conversion treatment". For example, this can be phosphating, in particular a layer-forming zinc phosphating or a conversion treatment with chromium-free treating agents, for example based on complex fluorides of titanium and/or zirconium and/or polymeric organic complexants. Such pretreatment methods are known in the prior art.

In a particularly preferred embodiment of the present invention, a low molecular weight compound (=a compound with a molecular weight of maximum 700 g/mol) that comprises at least one radically polymerizable crosslinkable group and at least one active hydrogen group is added to the abovementioned pretreatment solution. Such radically crosslinkable low molecular weight compounds are for example unsaturated carboxylic acids or unsaturated carboxylic acid amides, particularly acrylic acid, methacrylic acid, acrylamide, methacrylamide. However, acrylate- or methacrylate-functional sulfonic acids or phosphoric acid or phosphonic acid compounds or their derivatives can also be used. These polymerizable low molecular weight compounds are added in amounts between 0.1 to 40 wt. %, preferably between 0.1 and 20 wt. %, (based on the total composition of the solution) to a known pretreatment solution or to a solvent such as for example water. The pretreatment solution, modified in this way, does not comprise any polymerization initiators.

The addition of the abovementioned low molecular weight, radically polymerizable compounds to the pretreatment solution yields a particularly effective adhesion promotion between the metallic substrate pretreated in this way and the subsequently deposited conductive and weldable anti-corrosion composition. Hereafter, these types of adhesion-promoting low molecular weight, polymerizable compounds will be simply called "polymerizable adhesion promotors".

However it is not absolutely necessary that the pretreatment solution comprise, besides the cited polymerizable adhesion promoters, additional components that in the context of a conversion treatment react with the metal surface. Rather, the pretreatment solution can exclusively comprise (apart from optional solvents such as for example water and optional reagents for adjusting the preferred acidic pH to 1 to 4 for example) the polymerizable adhesion promoters as the reactive substances, which remain on the metal surface. In particular, this can be the case when the anti-corrosion composition comprises powdered zinc or aluminum as the conductive pigment c), which was itself subjected to a conversion treatment.

The pretreatment solution that comprises the cited polymerizable adhesion promotor, can additionally comprise UV-curable polymers such as, for example polyacrylates, polyurethanes or polyesters, which possess more polymerizable double bonds. In this way, the adhesion between the subsequently applied inventive anti-corrosion composition and the metal surface can be further improved. Moreover, this pretreatment solution can additionally comprise electrically conductive pigments that remain on the metal surface in the pretreatment. In this way, the electrical resistance between the subsequently deposited inventive anti-corrosion composition and the metal surface is reduced, thereby improving the weldability by electrowelding.

The pretreatment solution is applied by known methods onto the sheet to be pretreated. The application can be made e.g. with a so-called chem-coater or by means of a roller or by spraying as well as by immersion or flooding. After drying, the essentially solvent-free anti-corrosion composition can then be directly applied. However, the pretreated sheet can also be stored before applying the inventive anti-corrosion composition.

Preferably, the wet film thickness of the inventive anti-corrosion composition applied onto the metal surface is such that after curing, the obtained layer thickness is in the range of about 0.5 to about 10 μm. The layer thicknesses are preferably adjusted to around 4 μm, for example 1 to 6 μm.

Generally, is applied at temperatures between 0 and 90° C., preferably 15 and 70° C. and especially 40 to 60° C. The coating is then crosslinked by means of energy-rich radiation as described earlier. The anti-corrosion composition must have a suitable viscosity at the application temperature, as defined previously. For an application temperature of 60° C., for example, the inventive anti-corrosion agent has a viscosity, measured at the application temperature with a DIN flow cup (4 mm nozzle), in the range 10 to 120 seconds, preferably in the range 30 to 90 seconds.

In a particular process embodiment, the amount of oxygen can be reduced in the zone above the substrate to be crosslinked. In particular it should be less than 3000 ppm, preferably less than 1000 ppm. This can be accomplished, for example, by a partial or complete exchange of the surrounding air with inert gases in the crosslinking zone, e.g. with argon, nitrogen, $CO_2$ or mixtures thereof. An advantage of this process embodiment is that the required concentration of photoinitiator in the anti-corrosion composition can be reduced.

Accordingly, in a further aspect the invention relates to a process for coating metal surfaces with a conductive organic anti-corrosion layer, wherein
a) when required the metal surfaces are cleaned,
b) the metal surfaces are contacted with a liquid that comprises at least one organic compound having a molecular weight of not more than 700 g/mol, which has at least one radically polymerizable crosslinkable group and at least one group with active hydrogen,
c) the metal surfaces are then coated with a composition as described herein with a layer thickness such that after curing in the subsequent step d) a layer thickness in the range 0.5 to 10 μm, preferably in the range 1 to 6 μm, is obtained, and then,
d) the applied coating is cured by irradiation with energy-rich radiation for a time in the range 0.001 to 300 seconds, preferably in the range 0.1 to 30 seconds.

The present invention also relates to a process for coating a metallic object with an electrically conductive organic anti-corrosion layer, wherein (when required after cleaning the metal surface) the metal surfaces are first contacted with a liquid that comprises at least one organic compound having a molecular weight of not more than 700 g/mol, which has at least one radically polymerizable (especially initiated by UV-radiation) crosslinkable group and at least one group with active hydrogen. This liquid can comprise further active substances that react with the metal surface in the scope of a conversion treatment. This step improves the adhesion of the electrically conductive organic anti-corrosion layer on the metal surface. After that the metal surfaces are coated with the above-described anti-corrosion composition that comprises conductive pigments as well as an organic binder system that is curable by means of energy-rich radiation such as, for example UV-radiation. An advantage of this process is that the solvent-free conductive layer applied on the conversion pretreatment can be cured with relatively short UV lamp stations within fractions of a second at the specified high strip speeds of a coil coating process, wherein the substrate is only insignificantly heated. Metallic substrate, coated in this way can preferably be used in the automobile construction industry. The conductive coating enables subsequent process steps that are typical for automobiles, such as shaping, bending, deep drawing processes, welding, glueing, cleaning, cathodic dipcoating of the basic bodywork and similar process steps. The low thermal exposure of the substrate allows the application of the inventive coating on "bake-hardening" steel. Moreover, the coating applied in accordance with the inventive process is suitable for an in-line process, i.e. the coating with the adhesion promoting pretreatment and the electrically conductive coating can be carried out directly after galvanization of the steel strip. This enables a reduction in process steps. Thus, it is possible to dispense with separate galvanization and coil coating lines and combine these steps in a common production line.

The metal surfaces to be coated are preferably selected from surfaces of galvanized or alloy galvanized steel from electrolytically or melt dipcoated processes or of aluminum. Examples of alloy galvanized steels are the materials Galvannealed® (Zn/Fe-alloy), Galfan® (Zn/Al-alloy) and Zn/Ni-alloy coated steel.

Finally, the invention relates to all metallic objects with an anti-corrosion layer obtained according to the inventive process. The inventively manufactured anti-corrosion layer can also be coated with further paint layers. When the inventively coated metal parts are used in automobile construction and in the domestic appliance industry, for example, chemical treatment steps for anti-corrosion treatment of the finished components can be dispensed with. The assembled components that carry the inventive coating can be directly painted, for example by powder coating or by electrolytic dipcoating. In areas that are not painted, for example in cavities in automobile body parts, the inventively coated metal parts possess a sufficiently high corrosion resistance. In this way, costly process steps, such as for example a cavity conservation, can be dispensed with. This simplifies the production process in vehicle construction and thus reduces production costs. Moreover, in comparison with a conventional cavity sealing, it leads to weight savings and thereby to a lower fuel consumption.

When zinc is used as the conductive pigment, an advantage of the inventively coated material consists in the very good compression molding behavior resulting in less abrasion during compression molding. In this way the amount of lubrication during compression molding can be reduced.

The conductive organic layer manufactured according to the inventive process therefore offers the basis for an additional painting, as is usually the case in metalworking. For example, a powder coat layer can be applied on the conductive organic layer. Accordingly, in an extended aspect, the invention relates to a metal object that on the metal surface has a coating system of the following individual layers:
a) conductive organic anti-corrosion layer obtained according to the process described herein,
b) powder coat layer with a thickness of 70 to 120 μm.

Powder coating is particularly customary in machine construction, for metal parts for internal construction of buildings, in the furniture and domestic appliance industries. Due to higher mechanical and corrosive demands, today's automobile construction industry prefers multilayer systems in which a diverse series of organic coatings, for example a cathodic electro depositioning, a filler layer and a single or two-layer top coat are applied onto a base coat. The conductive anti-corrosion coating obtained according to the inventive process can serve as the base coat. Accordingly, in a further aspect, the invention includes a metal object that on the metal surface has a coating system of at least the following individual layers:
a) conductive organic anti-corrosion layer obtained according to the process described herein,
b) electro deposition paint, and
c) at least one, preferably a single or two-layer, top coat.

As is normally the case, a filler layer can be located between the electro deposition paint and top coat. In this case, the electro deposition paint usually has a layer thickness in the range of about 15 to 20 µm.

However, a thicker layer of cathodically deposited electro deposition paint, for example in the range of 25 to 35 µm, can also be deposited on the inventively obtained conductive anti-corrosion coating. In this case the previously customary filler layer can be dispensed with, and the single or double layer top coat can be directly deposited on the cathodic electro deposition paint. According to this embodiment of the present invention, the filler can be economized, as its function (in particular the increased stone-chip resistance) is assumed by the electro deposition paint. Thus a painting step can be dispensed with. Moreover, the total coating system in accordance with the present invention is thinner than is normal in the prior art. An economy in material results, leading to economical and ecological advantages.

The top coat can be designed as a single or double layer. The double layer design consists of a so-called base coat that mainly takes care of the visual impression of the coating system, and a clear coat that essentially has a protective function and through which the base coat is visible. Because the base material is already supplied with the conductive organic layer, the previously required steps involving the production of the chemical conversion layer and the deposition of various organic coatings are simplified for the manufacturer of metal objects e.g. vehicles or domestic appliances.

The invention also includes the processes for coating a metal object, which yield the above described metal objects. It further includes the total process sequence, in which firstly the conductive organic anti-corrosion coating is manufactured (preferably in the coil coating process), from which, sheet metal objects, such as for example, automobile body parts or domestic appliances are manufactured and which are subsequently over painted, for example by electro deposition painting or by powder coating.

Firstly, this relates to a process for manufacturing a metal object wherein
I) sheets are produced with a coated metal surface, in which
   a) when required the metal surface is cleaned,
   b) the metal surfaces are contacted with a liquid that comprises at least one organic compound having a molecular weight of not more than 700 g/mol, which has at least one radically polymerizable crosslinkable group and at least one group with active hydrogen,
   c) the metal surfaces are then coated with a composition according to the invention as described herein with a layer thickness such that after curing in the subsequent step d) a layer thickness in the range 0.5 to 10 µm, preferably in the range 1 to 6 µm, is obtained, and then,
   d) the applied coating is cured by irradiation with energy-rich radiation for a time in the range 0.001 to 300 seconds, preferably in the range 0.1 to 30 seconds,
II) the sheet is shaped and/or assembled into metal objects with metal surfaces,
III) when required, the metal surfaces of the metal object are cleaned and
IV) the metal surfaces of the metal object are coated with a powder coat with a thickness of 70 to 120 µm.

In addition, this relates to a process for manufacturing a metal object, wherein
I) sheets are produced with a coated metal surface, in which
   a) when required the metal surface is cleaned,
   b) the metal surface is contacted with a liquid that comprises at least one organic compound having a molecular weight of not more than 700 g/mol, which has at least one radically polymerizable crosslinkable group and at least one group with active hydrogen,
   c) the metal surface is coated with a composition according to the invention as described herein with a layer thickness such that after curing in the subsequent step d) a layer thickness in the range 0.5 to 10 µm, preferably in the range 1 to 6 µm, is obtained, and then,
   d) the applied coating is cured by irradiation with energy-rich radiation for a time in the range 0.001 to 300 seconds, preferably in the range 0.1 to 30 seconds,
II) the sheet is shaped and/or assembled into metal objects with metal surfaces, when required the metal surfaces of the metal objects are cleaned and
III) the metal surfaces of the metal object are coated with a cathodically depositable electro deposition paint and then
IV) coated with a single or double coated top coat, wherein a filler layer can be deposited between the steps IV) and V).

In a specific embodiment of this, the electro deposition paint is deposited with a higher layer thickness than previously and the filler layer between the electro deposition paint and the top coat is dispensed with. Accordingly, this specific embodiment relates to a process for manufacturing a metal object, wherein
I) sheets are produced with a coated metal surface, in which
   a) when required the metal surface is cleaned,
   b) the metal surface is contacted with a liquid that comprises at least one organic compound having a molecular weight of not more than 700 g/mol, which has at least one radically polymerizable crosslinkable group and at least one group with active hydrogen,
   c) the metal surface is then coated with a composition according to the invention as described herein with a layer thickness such that after curing in the subsequent step d) a layer thickness in the range 0.5 to 10 µm, preferably in the range 1 to 6 µm, is obtained, and then,
   d) the applied coating is cured by irradiation with energy-rich radiation for a time in the range 0.001 to 300 seconds, preferably in the range 0.1 to 30 seconds,
II) the sheet is shaped and/or assembled into metal objects with metal surfaces,
III) when required, the metal surfaces of the metal object are cleaned and
IV) the metal surfaces of the metal object are coated with a cathodically deposited electro deposition paint with a thickness in the range 25 to 35 µm and then, without applying a filler coat,
V) coated with a single or double layer top coat.

Advantageously, the cited assembly of the sheets into the metal objects results at least partially by means of electro welding, which is made possible by the electrical conductivity of the organic anti-corrosion coating.

The invention will now be described in more detail by means of several examples.

EXAMPLES a) Manufacture and Application of a Pretreatment Solution Prior to Coating with the Inventive Anti-corrosion Composition.

A conversion treatment concentrate of the following composition was built:

TABLE A

|  | Parts (wt. %) |
|---|---|
| demineralized water | 64.6 |
| $H_3PO_4$ (75%) | 4.6 |
| $H_2TiF_6$ (60%) | 8.0 |
| Aminomethyl substituted polyvinylphenol | 20.4 |
| Manganese(II) oxide | 2.4 |

The composition of Table A was treated with 18 g of a mixture of mono-, di- and triesters of the phosphoric acid of 2-hydroxyethyl (meth)acrylate and stirred for 2 minutes. 100 g of demineralized water were then added. The pretreatment solution was then ready for use.

The pretreatment solution was applied to a galvanized metal sheet that had been cleaned with alkaline cleaners (e.g. Ridoline® C 72, Ridoline® 1340; dip/spray-cleansing products commercially available from Henkel Corporation), and dispersed over the metal surface by means of a rubber wiper. The product was dried at 70° C. for 5 minutes.

b) Manufacturing Procedure and Application of the Anti-corrosion Composition:

The organic binders were placed in a dispersion tank at room temperature and the conductive pigment (mixture) was added in portions under mixing with a disperser at 1600 rpm. After homogenization, the anti-corrosion pigment (mixture) was added and mixed for 5 minutes. The photoinitiator or a mixture of photoinitiators, and the additives were then added. Homogenization was continued until a uniform formulation was obtained. The anti-corrosion composition was applied with a doctor blade or a roll-coater onto the pretreated sheets and cured by irradiation with UV lamps (Fusion VPS/1600, HD-emitter, each 240 W/cm, each with 100% power, focal distance of the lamps 1-2 cm) at a line speed of 20 m/minute.

Test Methods:
Corrosion Test (According to DIN 50021):

The edges of the coated test sheet were masked with adhesive tape. A freshly cut edge was produced on one long side. The sheet was then scored. Finally, the test sheet was placed in the salt spray test equipment. The degree of white rust was determined periodically at the score, edge and on the sheet surface. The number of hours for the red rust to appear on the test sheets is given in the tables.

MEK Resistance:

A block weighing 1 kg was wrapped in cotton wool dipped in methyl ethyl ketone (MEK) and guided over the test surface coated with the anti-corrosion composition. The number of double passes required to remove the coating to make visible the metallic subsurface were counted and reflects the solvent resistance.

T-Bend-Test: According to ECCA-Test Method T7 (1996): "Resistance to Cracking on Bending"

The coated sheet was bent around 180° with a press brake. An adhesive tape (Tesafilm 4104) was stuck to the edge and ripped off. Cracking on the bent edge was determined according to DIN 53230.

Reverse Impact-test: According to ECCA-test Method T5 (1985): "Resistance to Crack Formation Under Rapid Deformation"

The sheet, coated on one side, was deformed with an impact tester (weight: 2 kg, height 1 m). An adhesive tape (Tesafilm 4104) was stuck to the resulting bulge and ripped off. The quantity of coating that was removed by the adhesive tape was determined visually.

Shallow Drawing:

Discs with a diameter of 65 mm were stamped out of a sheet material coated on one side, and deburred, cleaned and weighed. Drawing oil was then applied and cups (Erichsen type 224/2) were drawn with a draw depth of 19 mm. The discs were then cleaned with gasoline and again weighed. The abrasion on deep drawing was determined from the difference in weights.

Resistance to Alkali:

The cups from the shallow drawing test were immersed in Ridoline® 1559 for 5 minutes, rinsed with water and dried with compressed air. The removed coating (in $g/cm^2$) was determined by weighing.

Welding Tests:

Electro-welding tests were carried out with a welding machine from Dalex (type: PMS 11-4) under typical automobile conditions. Welding spots were determined according to the Daimler-Chrysler specification DBL 4062/4066. The sheets coated with the inventive anti-corrosion composition were found to be electro-weldable under practical conditions with an adequate electrode life.

Details of the composition of the inventive anti-corrosion compositions and test results can be found in the following tables. The following abbreviations or terms are used:

M=molecular weight mPas=millipascal seconds for the viscosity data of the resin components DPGDA=dipropylene glycol diacrylate TMPFA=trimethylolpropane formal acrylate as the reactive diluent.

Further reactive diluents of the examples: example 17: propoxy diacrylate; example 24: epoxy acrylate; example 25: phenoxy acrylate; example 26 epoxy acrylate and hydroxyalkyl methacrylate. The chlorinated polyester acrylate in example 23 comprises 40 wt. % trimethylol propane triacrylate as the reactive diluent electr. conductive pigment 1=zinc powder electr. conductive pigment 2=graphite powder.

All compositions had a viscosity at 60° C., determined with the DIN cup, as described in the text, of 30 to 120 seconds.

TABLE 1

|  | Example 1 | Example 2 | Example 3 | Example 4 | Example 5 | Example 6 | Example 7 |
|---|---|---|---|---|---|---|---|
| Aliph. urethane acrylate M = 700 g/mol |  |  |  |  | 1.2% |  |  |
| Arom. urethane acrylate M = 5800 g/mol |  |  |  |  |  |  |  |
| DPGDA M = 240 g/mol |  |  |  | 18.8% |  |  |  |
| Epoxy diacrylate M = 530 g/mol |  |  |  |  |  |  | 7.2% |
| Hexane diol diacrylate |  |  |  |  |  |  | 1.8% |
| Hydroxyalkyl methacrylate M = 144 g/mol | 3.5% | 2.7% |  | 3.2% |  |  |  |

TABLE 1-continued

|  | Example 1 | Example 2 | Example 3 | Example 4 | Example 5 | Example 6 | Example 7 |
|---|---|---|---|---|---|---|---|
| Oligo urethane acrylate 1100 mPas |  |  |  |  |  |  | 9.0% |
| Aliph. urethane acrylate M = 1300 g/mol |  |  |  |  |  |  |  |
| Polyethylene glycol diacrylate M = 300 g/mol |  |  |  |  |  |  |  |
| Aliph. urethane acrylate M = 5000 g/mol |  |  | 34.9% |  |  |  |  |
| Polyurethane acrylate 3500 mPas | 8.1% | 6.2% |  | 7.6% |  |  |  |
| Phosphoric acid ester ~1000 mPas |  |  | 4.4% |  |  |  |  |
| TMPFA | 12.6% | 9.6% | 35.0% | 11.5% | 19.2% | 17.8% | 17.8% |
| electr. conductive pigment 1 | 72.2% | 75.0% |  | 70.0% | 77.4% | 71.7% | 71.7% |
| electr. conductive pigment 2 |  |  | 2.0% |  |  |  |  |
| Ca-ion modif. Silica | 2.1% | 5.0% |  | 5.0% | 1.9% |  |  |
| 1-Hydroxycyclohexyl phenyl ketone |  |  |  |  |  |  |  |
| 50% 1-Hydroxycyclohexyl phenyl ketone + 50% benzophenone | 0.5% | 0.5% | 1.0% | 0.5% | 0.5% | 0.5% | 0.5% |
| BAPO Phenyl bis(2,4,6-trimethylbenzoyl) phosphine oxide | 1.0% | 1.0% | 3.9% | 1.0% | 1.0% | 1.0% | 1.0% |
| Cross cutting (DIN 53151) | 0 | 0 | 0 | 0 | 0 | 0 | 0 |
| $T_0$ (ECCA T 20) | 2 | 4 | 3 | 4 | 2 | 5 | 5 |
| Reverse impact (2 kg/1 m) (ECCA T 5) | 0 | 0 | 1 | 0 | 1 | 5 | 3 |
| MEK double swabs | 5 | 7 | >100 | 15 | 6 | >100 | >100 |
| Salt spray test (DIN 50021) | 500 h | — | 1300 h | 1000 h | 400 h | 1500 h | >1300 h |

TABLE 2

|  | Example 8 | Example 9 | Example 10 | Example 11 | Example 12 |
|---|---|---|---|---|---|
| Aliph. urethane acrylate M = 700 g/mol |  |  |  |  |  |
| Arom. urethane acrylate M = 5800 g/mol | 9.0% |  |  |  |  |
| DPGDA M = 240 g/mol |  |  | 2.8% |  |  |
| Epoxy diacrylate M = 530 g/mol |  |  |  |  |  |
| Hexane diol diacrylate |  | 2.8% |  |  |  |
| Hydroxyalkyl methacrylate M = 144 g/mol |  |  |  |  |  |
| Oligo urethane acrylate 1100 mPas |  |  |  |  |  |
| Aliph. urethane acrylate M = 1300 g/mol |  |  |  |  | 2.8% |
| Polyethylene glycol diacrylate M = 300 g/mol |  |  |  | 2.8% |  |
| Aliph. urethane acrylate M = 5000 g/mol |  |  |  |  |  |
| Polyurethane acrylate 3500 mPas |  |  |  |  |  |
| Phosphoric acid ester ~1000 mPas |  |  |  |  |  |
| TMPFA | 17.8% | 18.8% | 18.8% | 18.8% | 18.8% |
| electr. conductive pigment 1 | 71.7% | 75.0% | 75.0% | 75.0% | 75.0% |
| electr. conductive pigment 2 |  |  |  |  |  |
| Ca-ion modif. Silica |  | 1.9% | 1.9% | 1.9% | 1.9% |
| 1-Hydroxycyclohexyl phenyl ketone |  |  |  |  |  |
| 50% 1-Hydroxycyclohexyl phenyl ketone + 50% benzophenone | 0.5% | 0.5% | 0.5% | 0.5% | 0.5% |
| BAPO Phenyl bis(2,4,6-trimethylbenzoyl) phosphine oxide | 1.0% | 1.0% | 1.0% | 1.0% | 1.0% |
| Cross cutting (DIN 53151) | 0 | 0 | 0 | 0 | 0 |
| $T_0$ (ECCA T 20) | 5 | 4 | 4 | 5 | 5 |
| Reverse impact (2 kg/1 m) (ECCA T 5) | 2 | 4 | 4 | 2 | 2 |
| MEK double swabs | 15 | >100 | 70 | 80 | >100 |
| Salt spray test (DIN 50021) | 1000 h | 1200 h | 1200 h | 1000 h | 1000 h |

TABLE 3

|  | Example 13 | Example 14 | Example 15 | Example 16 | Example 17 | Example 18 | Example 19 | Example 20 | Example 21 | Example 22 | Example 23 |
|---|---|---|---|---|---|---|---|---|---|---|---|
| Aliph. urethane acrylate M = 2200 g/mol |  | 2.9% |  |  |  |  |  |  |  |  |  |
| Arom. urethane acrylate M = 3500 g/mol |  |  |  |  |  |  |  |  |  |  |  |
| Aminoalkyl silane M = 221 g/mol |  |  |  |  | 3.7% |  |  |  |  |  |  |
| Arom. urethane acrylate M = 5800 g/mol |  |  |  |  |  |  |  |  |  |  |  |
| Chlorinated polyester acrylate M = 47500 g/mol |  |  |  |  |  |  |  |  |  |  | 38.7% |
| DPGDA M = 240 g/mol |  |  |  |  |  |  |  |  | 5.4% |  |  |
| Hydroxyalkyl methacrylate M = 144 g/mol | 4.1% |  |  |  |  |  |  |  |  |  |  |
| Isobornyl acrylate |  |  |  |  |  | 14.5% |  |  |  |  |  |

TABLE 3-continued

| | | | | | | | | | | | |
|---|---|---|---|---|---|---|---|---|---|---|---|
| Oligo urethane acrylate 3300 mPas (at 60° C.) | | | | | 4.8% | | | | | | |
| Nonylphenol ethoxy acrylate | | | | | | | 14.5% | | | | |
| Aliph. urethane acrylate M = 5000 g/mol | | 5.3% | 17.8% | 13.9% | | 8.0% | 8.0% | 10.2% | 10.1% | 7.6% | |
| Polyurethane acrylate 3500 mPas | 9.7% | | | | | | | | | | |
| Propoxy diacrylate 15 mPas | | | | 12.8% | | | | | | | |
| Titanium(IV) isopropylate M = 284 g/mol | | | | | | | | | | 5.0% | |
| Urethane acrylate 2000 mPas (60° C.) | | | 3.0% | | | | | | | | |
| TMPFA | 15.0% | 13.4% | 56.2% | 36.6% | | 6.5% | 6.5% | 18.8% | 13.5% | 20.0% | |
| electr. conductive pigment 1 | 64.5% | 75.1% | 19.4% | 40.0% | 77.5% | 67.0% | 67.0% | 67.0% | 67.0% | 63.6% | 57.8% |
| electr. conductive pigment 2 | | | 3.5% | 5.0% | | | | | | | |
| Ca-ion modif. silica | 5.0% | 1.8% | 1.6% | | | 2.5% | 2.5% | 2.5% | 2.5% | 2.4% | 2.2% |
| 1-Hydroxycyclohexyl phenyl ketone | | | | | 0.5% | | | | | | |
| 50% 1-Hydroxycyclohexyl phenyl ketone + 50% benzophenone | 0.6% | 0.5% | 0.5% | 0.5% | | 0.5% | 0.5% | 0.5% | 0.5% | 0.5% | 0.4% |
| BAPO Phenyl bis(2,4,6-trimethyl-benzoyl) phosphine oxide | 1.1% | 1.0% | 1.0% | 1.0% | | 1.0% | 1.0% | 1.0% | 1.0% | 0.9% | 0.9% |
| 2-Hydroxy-2-methyl-1-phenyl-1-propanone | | | | | 0.7% | | | | | | |
| Cross cutting (DIN 53151) | 0 | 0 | 0 | 0 | 1 | 0 | 0 | 0 | 0 | 0 | 4 |
| $T_0$ (ECCA T 20) | 3 | 4 | 5 | 5 | 5 | 5 | 5 | 5 | 5 | 5 | 5 |
| Reverse impact (2 kg/1 m) (ECCA T 5) | 0 | 1 | 1 | 0 | 5 | 1 | 5 | 0 | 0 | 1 | 5 |
| MEK double swabs | 4 | 20 | 15 | 12 | >50 | 7 | >50 | 12 | >50 | >50 | >50 |
| Salt spray test (DIN 50021) | 1300 h | 1800 h | 700 h | 500 h | 800 h | >1300 h | 500 h | >1200 h | >1200 h | >1700 h | 500 h |

| | Example 24 | Example 25 | Example 26 | Example 27 | Example 28 | Example 29 | Example 30 | Example 31 | Example 32 |
|---|---|---|---|---|---|---|---|---|---|
| Aliph. urethane acrylate 40000 mPas | | | | | | | | 2.9% | |
| Arom. urethane acrylate M = 5800 g/mol | | | | | | 4.8% | | | |
| Epoxy acrylate M = 500 g/mol | 21.8% | | | | | | | | |
| Hydroxyalkyl acrylate M = 144 g/mol | | | | 3.1% | | | | | |
| Hydroxyalkyl methacrylate M = 144 g/mol | | 4.0% | 4.0% | 3.9% | 3.9% | 3.9% | 4.0% | 3.9% | 3.9% |
| Epoxy acrylate M = 750 g/mol | | | 14.3% | | | | | | |
| Oligo triacrylate 90 mPas | 7.3% | | | | | | | | |
| Phenoxy acrylate | | 14.3% | | | 4.8% | | | | |
| Polyurethane acrylate 3500 mPas | | 9.3% | 9.3% | 9.0% | 9.2% | 9.2% | 9.4% | 9.2% | 9.2% |
| Propoxy diacrylate 15 mPas | | | | | | | | 1.8% | |
| 4-Hydroxybutyl vinyl ether | | | | | | | | | 4.8% |
| TMPFA | | | | 13.8% | 14.3% | 14.3% | 14.6% | 14.3% | 14.4% |
| electr. conductive pigment 1 | 67.0% | 68.4% | 68.4% | 66.3% | 61.4% | 61.4% | 62.6% | 61.6% | 61.4% |
| electr. conductive pigment 2 | | | | | | | | | |
| Ca-ion modif. silica | 2.5% | 2.0% | 2.0% | 1.9% | 4.8% | 4.8% | 7.8% | 4.8% | 4.8% |
| 50% 1-Hydroxycyclohexyl phenyl ketone + 50% benzophenone | 0.5% | 1.0% | 1.0% | 0.9% | 0.6% | 0.6% | 0.6% | 0.5% | 0.5% |
| BAPO Phenyl bis(2,4,6-trimethyl-benzoyl) phosphine oxide | 0.9% | 1.0% | 1.0% | 1.1% | 1.0% | 1.0% | 1.0% | 1.0% | 1.0% |
| Cross cutting (DIN 53151) | 0 | 0 | 1 | 2 | 0 | 0 | 0 | 0 | 0 |

TABLE 3-continued

| | | | | | | | | | |
|---|---|---|---|---|---|---|---|---|---|
| $T_0$ (ECCA T 20) | 5 | 3 | 5 | 4 | 2 | 2 | 3 | 4 | 2 |
| Reverse impact (2 kg/1 m) (ECCA T 5) | 5 | 0 | 0 | 1 | 0 | 0 | 0 | 0 | 0 |
| MEK double swabs | >50 | 5 | >50 | 8 | 5 | 7 | 4 | 7 | 2 |
| Salt spray test (DIN 50021) | 500 h | 1400 h | 800 h | 1600 h | 1000 h | 600 h | 1000 h | 600 h | 500 h |

What is claimed is:

1. An electrically conductive and weldable composition for coating metal surfaces, comprising, based on the total composition:
 a) 5 to 45 wt. % of an organic binder that is free of ingredients comprising reactive or blocked isocyanate groups wherein the organic binder comprises:
  aa) at least one radically polymerizable resin selected from the group consisting of polyester-, urethane- or epoxy-modified (meth)acrylate resins and mixtures thereof,
  ab) at least one reactive diluent,
  ac) at least one photoinitiator;
 b) 0 to 15 wt. % of at least one anti-corrosion pigment and/or at least one corrosion inhibitor; and
 c1) 55 to 90 wt. % of a conductive pigment with a density of at least 3 g/cm³, in powder form, selected from the group consisting of zinc, iron, stainless steel, molybdenum disulphide, iron phosphide, iron oxide, and mixtures thereof such that
  the sum $\Sigma(x_{L(i)})$ of weight fractions of all conductive pigments $(x_{L(i)})$ in the total composition, expressed as a decimal fraction, is in the range $\Sigma\{(0.09$ to $0.13)*D_i*a_i\}$, where $D_i$ is the density of the i-th conductive pigment in g/cm³ and $a_i$ is the fraction of the weight of the i-th conductive pigment in the total weight of all the conductive pigments; and
  the sum $\Sigma(x_{L(i)})$ of the weight fractions of all the conductive pigments $(x_{L(i)})$ in the total composition, expressed as the decimal fraction, is not more than 0.9,
 said composition comprising below 1 wt. % solvent and proportions of the components a), b) and c1) total 100 wt. %, the components being selected such that the composition has a viscosity, at a temperature for application of said composition, measured according to DIN 53211 with a DIN flow cup having a 4 mm flow nozzle, in the range of 10 to 120 seconds.

2. The composition according to claim 1, additionally comprising:
 c2) 2 to 20 wt. % of a conductive pigment with a density of less than 3 g/cm³, where proportion of the components a), b), c1) and c2) total 100 wt. %.

3. The composition according to claim 2, wherein the conductive pigment c2) is selected from the group consisting of aluminum, carbon black, graphite and mixtures thereof, in powder form.

4. The composition according to claim 1, wherein the components are selected such that the composition has a viscosity in the range of 30 to 90 seconds.

5. The composition according to claim 1, wherein the conductive pigment c1) is selected from the group consisting of zinc, stainless steel, and molybdenum disulfide, and the conductive pigment c1) is different than the conductive pigment c2).

6. The composition according to claim 1, wherein the organic binder, based on the total amount of the organic binder, comprises
 2 to 80 wt. % of component aa),
 4 to 95 wt. % of component ab) and
 0.1 to 10 wt. % of component ac)
 wherein the amounts of components aa), ab) and ac) add up to 100 wt. % of component a).

7. The composition according to claim 1, wherein weight fraction $x_B$ of the organic binder in the total composition, expressed as a decimal fraction, is chosen such that $x_B$ is in the range $\{(0.5$ to $1)$ minus (sum $\Sigma(x_{L(i)})$ of the weight fractions of all conductive pigments$\}$.

8. The composition according to claim 1, wherein the radically polymerizable resin has a molecular weight between 500 and 100,000 g/mol.

9. The composition according to claim 1, comprising as the component b) at least one anti-corrosion pigment and/or at least one corrosion inhibitor, selected from the group consisting of doped silica, silicates of divalent metals, aluminum- and zinc phosphates and modified products thereof, surface modified titanium dioxide, alkoxytitanates, silanes, zinc- or calcium gluconates and phosphoric acid esters of alkoxylated cellulose.

10. The composition according to claim 2, wherein the conductive pigment c1) consists of zinc, iron phosphide, iron oxide, all in powder form, or a mixture of two or more of these substances; and graphite, in powder form, is present as the component c2).

11. An electrically conductive and weldable composition for coating metal surfaces, comprising, based on the total composition:
 a) 5 to 45 wt. % of an organic binder, said binder being free of monomeric isocyanate compounds and compounds containing free or latent/blocked isocyanate groups;
 b) 0 to 15 wt. % of at least one anti-corrosion pigment and/or at least one corrosion inhibitor;
 c1) 55 to 90 wt. % of a conductive pigment with a density of at least 3 g/cm³, in powder form, selected such that
  the sum $\Sigma(x_{L(i)})$ of weight fractions of all conductive pigments $(x_{L(i)})$ in the total composition, expressed as a decimal fraction, is in the range $\Sigma\{(0.09$ to $0.13)*D_i*a_i\}$, where $D_i$ is the density of the i-th conductive pigment in g/cm³ and $a_i$ is the fraction of the weight of the i-th conductive pigment in the total weight of all the conductive pigments; and
  the sum $\Sigma(x_{L(i)})$ of the weight fractions of all the conductive pigments $(x_{L(i)})$ in the total composition, expressed as the decimal fraction, is not more than 0.9; and
 c2) 2 to 20 wt. % of a conductive pigment with a density of less than 3 g/cm³;
 wherein powdered zinc metal is present as part of component c1) and powdered graphite is present as part of component c2);
 wherein the conductive pigment containing zinc, has an average particle size between 1 and 8 µm; the composition being essentially solvent-free and proportions of the components a), b), c1) and c2) total 100 wt. %.

12. The composition according to claim 11, wherein the organic binder, based on the total wt. of the organic binder, comprises
- 2 to 80 wt. % of aa) at least one radically polymerizable resin selected from the group consisting of polyester-, urethane- or epoxy-modified (meth)acrylate resins and mixtures thereof,
- 4 to 95 wt. % of ab) at least one reactive diluent, and
- 0.1 to 10 wt. % of ac) at least one photoinitiator;
- wherein the amounts of components aa), ab) and ac) add up to 100 wt. % of component a).

13. The composition according to claim 12, wherein component b) is present and comprises calcium ion modified silica.

14. The composition according to claim 1, wherein the conductive pigment is present in an amount of 60 to 80 wt. %.

15. The composition according to claim 1, wherein the sum $\Sigma(x_{L(i)})$ of the weight fractions of all the conductive pigments $(x_{L(i)})$ in the total composition, expressed as the decimal fraction, is 0.2 to 0.9.

16. An electrically conductive and weldable composition for coating metal surfaces, consisting essentially of, based on the total composition:
- a) 5 to 42.2 wt. % of an organic binder that is free of ingredients consisting essentially of reactive or blocked isocyanate groups wherein the organic binder comprises:
  - aa) at least one radically polymerizable resin selected from the group consisting of polyester-, urethane- or epoxy-modified (meth)acrylate resins and mixtures thereof,
  - ab) at least one reactive diluent,
  - ac) at least one photoinitiator;
- b) 0 to 15 wt. % of at least one anti-corrosion pigment and/or at least one corrosion inhibitor;
- c1) 55 to 75.5 wt. % of a conductive pigment with a density of at least 3 g/cm³, in powder form, selected from the group consisting of zinc, iron, stainless steel, molybdenum disulphide and mixtures thereof; and
- c2) 2 to 20 wt. % of a conductive pigment with a density of less than 3 g/cm³ wherein both c1) and c2) are present and the total conductive pigment is present in the total composition in an amount of 57.8 to 80 wt. %, such that the sum $\Sigma(x_{L(i)})$ of weight fractions of all conductive pigments $(x_{L(i)})$ in the total composition, expressed as a decimal fraction, is in the range $\Sigma\{(0.09$ to $0.13)*D_i*a_i\}$, where $D_i$ is the density of the i-th conductive pigment in g/cm³ and $a_i$ is the fraction of the weight of the i-th conductive pigment in the total weight of all the conductive pigments;
- the sum $\Sigma(x_{L(i)})$ of the weight fractions of all the conductive pigments $(x_{L(i)})$ in the total composition, expressed as the decimal fraction, is not more than 0.9, said composition being essentially solvent-free and proportions of the components total 100 wt. %.

17. An electrically conductive and weldable composition for coating metal surfaces, comprising, based on the total composition:
- a) 20 to 40 wt. % of an organic binder that is free of ingredients comprising reactive or blocked isocyanate groups wherein the organic binder comprises:
  - aa) at least one radically polymerizable resin selected from the group consisting of polyester-, urethane- or epoxy-modified (meth)acrylate resins and mixtures thereof,
  - ab) at least one reactive diluent,
  - ac) at least one photoinitiator;
- b) 0 to 7.8 wt. % of at least one anti-corrosion pigment and/or at least one corrosion inhibitor; and
- c1) 57.8 to 77.5 wt. % of a conductive pigment with a density of at least 3 g/cm³, in powder form, selected from the group consisting of zinc, iron, stainless steel, molybdenum disulphide, and mixtures thereof such that the sum $\Sigma(x_{L(i)})$ of weight fractions of all conductive pigments $(x_{L(i)})$ in the total composition, expressed as a decimal fraction, is in the range $\Sigma\{(0.09$ to $0.13)*D_i*a_i\}$, where $D_i$ is the density of the i-th conductive pigment in g/cm³ and $a_i$ is the fraction of the weight of the i-th conductive pigment in the total weight of all the conductive pigments; and
- the sum $\Sigma(x_{L(i)})$ of the weight fractions of all the conductive pigments $(x_{L(i)})$ in the total composition, expressed as the decimal fraction, is not more than 0.9, said composition comprising below 1 wt. % solvent and proportions of the components a), b) and c1) total 100 wt. %, the components being selected such that the composition has a viscosity, at a temperature for application of said composition, measured according to DIN 53211 with a DIN flow cup having a 4 mm flow nozzle, in the range of 10 to 120 seconds.

18. The composition according to claim 1, wherein the conductive pigment c1) is selected from the group consisting of iron, stainless steel, molybdenum disulphide, iron phosphide, iron oxide, and mixtures thereof.

19. The composition according to claim 16, wherein the conductive pigment c1) is selected from the group consisting of iron, stainless steel, molybdenum disulphide, and mixtures thereof.

20. The composition according to claim 1, wherein the conductive pigment c1) is selected from the group consisting of iron, stainless steel, molybdenum disulphide, and mixtures thereof.

* * * * *